United States Patent [19]

Hodge

[11] 3,767,233

[45] Oct. 23, 1973

[54] COUPLING DEVICE FOR FLEXIBLE TUBING AND THE LIKE

[75] Inventor: George Robert Hodge, Cochranville, Pa.

[73] Assignee: None Such Enterprises, Inc., New Castle, Del.

[22] Filed: Aug. 10, 1971

[21] Appl. No.: 170,449

[52] U.S. Cl. ................................ 285/239, 287/111
[51] Int. Cl. ............................................ F16l 31/00
[58] Field of Search .................... 285/239, 370, 371, 285/373, 397, 419, 109, 345; 287/111, 85, 20.92 E, 104, 127; 24/31 B-31 C, 122.3-123 R

[56] References Cited
UNITED STATES PATENTS

| 148,276 | 3/1874 | Allen | 287/20.92 E |
| 317,157 | 5/1885 | Lowrie | 287/20.92 E |
| 3,221,746 | 12/1965 | Noble | 24/123 R |
| 3,389,046 | 6/1968 | Burress | 287/127 R X |
| 3,519,295 | 7/1970 | Dancio et al. | 287/127 R |
| 3,605,201 | 9/1971 | Peterson | 24/31 C |
| 48,709 | 7/1865 | Emory | 285/370 X |
| 3,456,965 | 7/1969 | Gajewski et al. | 285/419 X |

FOREIGN PATENTS OR APPLICATIONS

| 684,896 | 4/1964 | Canada | 285/239 |
| 74,732 | 12/1947 | Norway | 285/239 |

Primary Examiner—James R. Boler
Assistant Examiner—Wayne L. Shedd
Attorney—Howard E. Thompson, Jr.

[57] ABSTRACT

A coupling device for joining adjacent free ends of lengths of flexible tubing, hose, and other cylindrical members is provided in the form of similar parts which are connected together and which are generally of semi-cylindrical contour tapering from the mid-section to a reduced diameter at the ends thereof. The device has surface irregularities along the tapered portions so that when the ends are inserted into cylindrical members within a predetermined size range, the irregular surfaces of the tapered portions provide firm gripping engagement with the inner surfaces of the cylindrical members. The similar parts can be molded from resilient plastic materials to provide integral connecting members forming living hinge means. The surface irregularities can suitably be a series of frustoconical sections of progressively increasing size from the ends toward the mid-sections of said similar parts.

3 Claims, 7 Drawing Figures

PATENTED OCT 23 1973 3,767,233
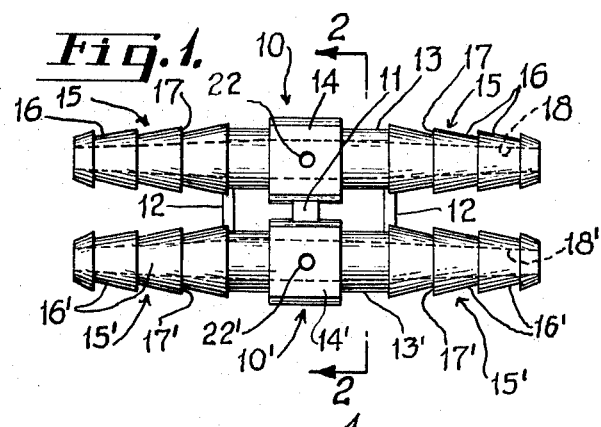
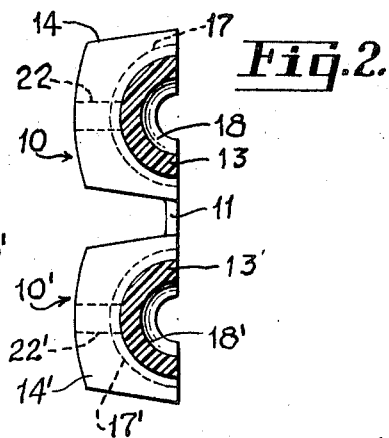
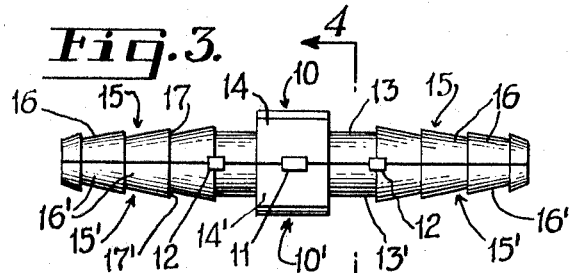
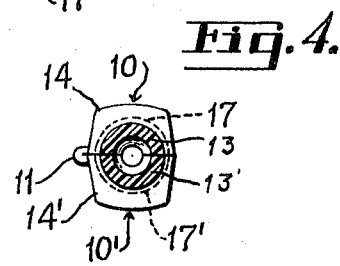
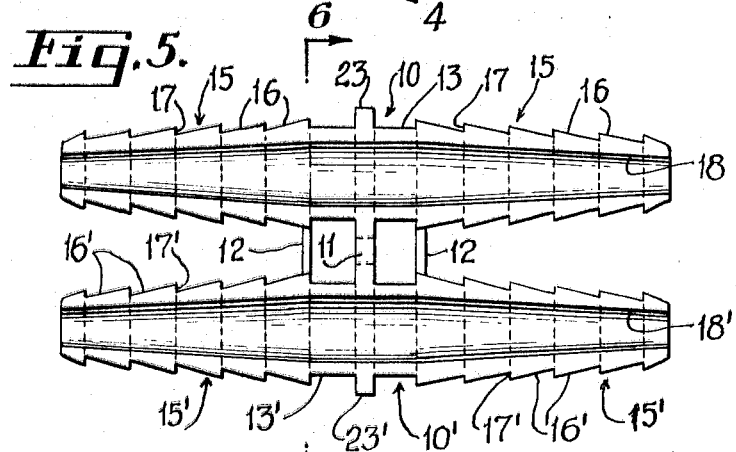
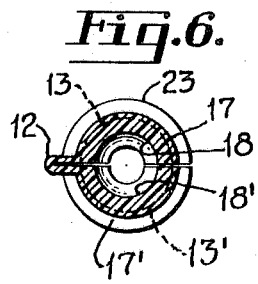
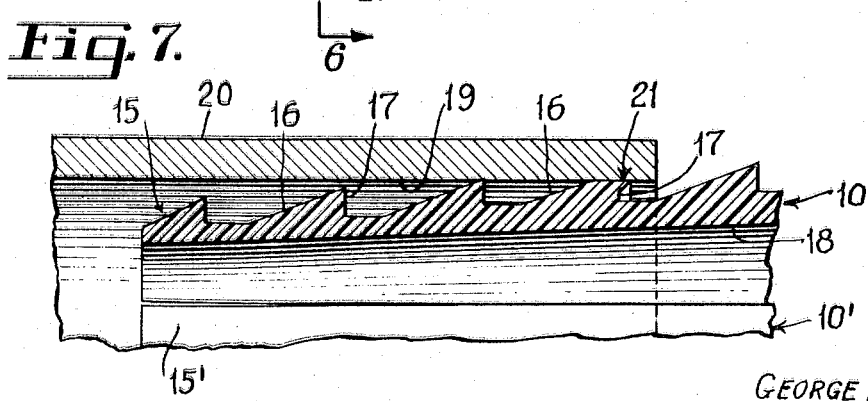
INVENTOR.
GEORGE ROBERT HODGE
BY
ATTORNEY

COUPLING DEVICE FOR FLEXIBLE TUBING AND THE LIKE

This invention relates to a coupling device for joining the free ends of adjacent lengths of flexible tubing, hose, and similar cylindrical members to each other.

BACKGROUND OF THE INVENTION

Although many devices have been heretofore provided to couple together the free ends of adjacent lengths of flexible tubing, hose, and the like, no prior art is known which is pertinent to the construction of the coupling device of this invention.

In the manufacture of long lengths of flexible, cylindrical members such as tubing, hose, and the like, the free ends of adjacent lengths are normally joined to each other in order to maintain an even flow of production and enable these lengths to be easily reeled for storage and subsequent shipping. One method employed to accomplish this is through the use of plastic friction tape which is wound about the adjacent free ends of these cylindrical members. This requires considerable time thereby slowing down production rates. Removal of the tape to uncouple the lengths of tubing, hose, or the like is equally time-consuming and, therefore, costly.

Other coupling means employed include generally cylindrical bodies of metal or molded plastic material normally provided in a number of different sizes to accommodate different sized tubing and hose. After the lengths of tubing or hose are coupled, it is often difficult to locate the joined ends since the ends of the hose or tubing may completely hide the coupling means. Furthermore, production of this type of cylindrical or tubular coupling means is inherently rather costly for an item serving such a temporary purpose.

THE INVENTION

It has now been found that the deficiencies and shortcomings of the prior art can be overcome through the novel coupling device of this invention which, in general, comprises two similar members or parts which are joined to each other intermediate their ends, each of the members being of a generally semi-cylindrical contour tapering from their mid-sections to a lesser dimension at their ends, the outer surfaces of the tapered portions being provided with a plurality of projections to form a series of irregularities thereon so that when said tapered ends of the juxtaposed parts are inserted into adjacent lengths of flexible cylindrical members, they firmly grip and engage the inner surfaces of said lengths thereby linking them to each other. Preferably, the coupling device is of unitary construction formed from moldable plastics with each of the two members forming one half of the coupling device, the means by which they are joined together being provided by a plurality of living hinges.

Through the coupling device of the invention, there is provided an inexpensive means for quickly and easily joining the ends of any number of lengths of flexible tubing or hose to each other in continuous lengths, thereby facilitating the manufacture of such flexible tubing as well as shipment and subsequent handling of them by a user.

The device can be formed from various types of materials but is preferably molded from suitable plastics which exhibit sufficient flexibility to form living hinges so that the two similar members can be molded in side-by-side position and superimposed upon each other for use.

The ability to mold the device with the two parts in side-by-side position enables the device to be completely formed between simple two-part molds, and the double tapered exterior contour can be achieved with a substantial saving of material by concurrently molding a corresponding double tapered inner contour.

The open-mold method of production also readily lends itself to providing coupling devices which can accommodate several different sized flexible tubings, thereby reducing the number of different sized coupling devices required. For example, one size coupling device can be produced to accommodate flexible tubings, and hose having inside diameters of from about ¼ to ⅜ inch, while another size can be provided to accommodate those having inside diameters of from about 13/32 to ⅝ inches. and so on.

The materials employed to form the coupling device should be such that sufficient strength is provided for the device to engage the inner surfaces of flexible tubing, hose, and the like, and withstand a pull of about 50 pounds for most small bore tubing and hose. When it is desired to couple together tubing, hose, and the like having larger inside diameters or increased wall thickness, the device should be made proportionately stronger to withstand a greater pulling force. For example, for tubing, hose, and the like having inside diameters of about 1.0 to 1.5 inches, the device should be able to withstand a pull of about 100 pounds.

The coupling device of the invention will be more fully understood from the following description when considered together with the accompanying drawing in which preferred embodiments of the device are illustrated with the various parts thereof identified by suitable reference characters in each of the views, and wherein:

FIG. 1 is a plan view of the outer surface of a coupling device shown in its open, inoperative condition;

FIG. 2 is a sectional view taken substantially on the line 2—2 of FIG. 1;

FIG. 3 is a side elevation view of the device shown in FIG. 1 in the juxtaposed or operative position;

FIG. 4 is a sectional view substantially on the line 4—4 of FIG. 3;

FIG. 5 is a view similar to FIG. 1 but taken from the underside and showing a modified form of construction;

FIG. 6 is a view of the device shown in FIG. 5 taken substantially on the line 6-6 but showing the parts in the juxtaposed operative position similar to that of FIG. 4; and, FIG. 7 is a fragmentary sectional view showing a portion of a coupling device in engagement with a tubular member.

As shown in FIGS. 1 and 2 of the drawing, a typical coupling device according to the present invention comprises two generally semi-cylindrical members 10, 10' which are normally oriented in side by side relation and connected by hinge means 11, 12 which facilitate movement from the side by side position shown in FIGS. 1 and 2 of the juxtaposed or operative position shown in FIGS. 3 and 4. Each of the parts 10, 10' include a mid-section 13, 13' having a central enlargement 14, 14' and are tapered beyond said mid-sections to reduced dimension at the ends thereof to provide tapered end portions 15, 15'. The tapered end portions have surface irregularities in the form of surfaces 16, 16' inclined in the direction of the ends of the device and intersecting radial surfaces 17,17' which collectively provide in the juxtaposed device as seen in FIGS. 3 and 4 essentially frusto-conical gripping members of progressively decreasing size from said mid-section to the ends of the device.

By casting or molding the device in the extended side by side relation shown in FIGS. 1 and 2, it will be apparent that the device can be fashioned between simple two part molds and that the inner contours 18, 18' can be of substantially larger diameter at the central or mid-section portion of the device than at the ends, thereby effecting a substantial saving of material.

Casting or molding the device from moderately flexible plastic materials such as polyethylene or polypropylene provides the desired combination of substantial rigidity in heavier wall portions of the device while permitting thin sections such as the hinged means 11,12 to function as living hinges. Furthermore, this limited flexibility enhances the gripping power of the device when engaged with inner surfaces of hoses and other tubular members. FIG. 7 is a fragmentary showing of a portion of the device 10,10' as shown in FIG. 1 in engagement with the inner surface 19 of a tubular member 20. Note that the tapered portions 15,15' extend into the tubular member 20 so that at least two of the surface irregularities formed by inclined surfaces 16 and radial surfaces 17 engage the inner surface 19 of the tubular member with the larger at least of the engaging members being flexed or deformed as seen at 21 in a manner to provide a strong gripping action with the inner surface 19 of the tubular member. This resilient gripping action is of particular significance since it enables the device to firmly engage inner surfaces of tubular members 20 regardless of the variation in internal dimensions of such tubular members within the size limits for which the particular device is intended.

By way of illustration, a single device can suitably handle three standard hose sizes. A small device, for example, may handle:

| Hose Size | Standard Tolerances |
|---|---|
| 1/4" | +.025",−.015" |
| 5/16" | +.031",−.016" |
| 3/8" | +.020",−.010" |

A next larger device might handle:

| Hose Size | Standard Tolerances |
|---|---|
| 13/32" | +.023",−.023" |
| 1/2" | +.040",−.023" |
| 5/8" | +.031",−.016" |

It will be understood that the size of the device can be increased as desired to be used with any size or type of hose while maintaining the advantage of being able to accommodate two or more adjacent standard hose sizes, thereby minimizing the number of different size coupling devices that must be stocked.

Returning now to the showing in FIGS. 1 to 4 of the drawing, it will be noted that the central enlargement 14,14' is of irregular contour protruding radially beyond the largest of the surface irregularities shown in dotted lines at 17,17' in FIGS. 2 and 4 by a small amount adjacent the juxtaposed portions of the device and by a substantial amount at the portions opposed thereto. This contour of the enlargement 14,14' permits close spacing of the portions 10,10' thereby minimizing mold size as will be apparent from FIGS. 1 and 2, while at the same time providing a stop or spacing means central of the juxtaposed device as shown in FIGS. 3 and 4, preventing engaged lengths of hose or other members from reaching a fully abutting position. Thus, the enlargement 14,14' provides means for readily detecting both visually and mechanically where one length of hose or other tubular member ends and the next begins. The enlargements 14,14' can also suitably include recesses 22,22' as shown in FIGS. 1 and 2 for inserting indicator or signalling means to facilitate the use and handling of bulk quantities of hose and the like where a number of joined lengths may be stored on large reels.

In the modified showing in FIG. 5 all parts of the device are identified with the same reference characters as used in FIGS. 1 to 4 with the exception of the central enlargement which in FIGS. 5 and 6 is shown at 23,23' as being concentric with the mid-section 13,13' and the surface irregularities 16,17 and 16', 17'. This concentric structure of the enlargement necessitates slightly wider spacing of the members in the mold as indicated in FIG. 5 but the concentric arrangement is considered to be somewhat preferable in instances where it is desired to use mechanical means for locating joints in the bulk handling of joined lengths of hose. Here again the enlargement 23,23' prevents engaged hose lengths from reaching a fully abutting relationship so that the hose joints are readily sensed both visually and mechanically.

In FIGS. 5 and 6 the enlargement 23,23' has been shown rather thin or short in the longitudinal dimension on the device compared with the enlargement 14,14' shown in FIGS. 1 to 4. It is to be understood, however, that the longitudinal dimension as well as the radial dimensions of the enlargements 14,14' and 23, 23' can be varied considerably in adapting the device for use with particular sensing means for the location of hose joints and the like.

Various changes and modifications in the coupling device herein disclosed may occur to those skilled in the art, and to the extent that such changes and modifications are embraced by the appended claims, it is to be understood that they constitute part of the present invention.

What is claimed is:

1. A coupling device for temporarily joining together lengths of flexible cylindrical members, said coupling device comprising a pair of similar resilient plastic parts of generally semi-cylindrical contour tapering from their mid-section to a lesser dimension at their ends to provide tapered end portions, integral flexible means hingedly joining said parts at their mid-sections for movement from a side by side to juxtaposed position forming a longitudinally split sleeve, the inner surfaces of said tapered end portions having uniform frustoconical contours extending from the ends to the mid-section of said device, the outer surfaces of said tapered end portions generally paralleling said inner surfaces and having a plurality of longitudinally spaced and circumferentially extending frustoconical projections with substantially radial ends which form a series of gripping edges thereon such that when said tapered end portions of the juxtaposed parts are inserted into adjacent ends of said flexible cylindrical members, they firmly grip and securely engage the inner surfaces thereof, and said mid-sections including spacer means protruding radially beyond the maximum diameter of engaged cylindrical members, thereby providing means for visually and mechanically detecting junctures between axially joined cylindrical members.

2. A coupling device as defined in claim 1, wherein said spacer means protrudes non-uniformly beyond said tapered end portions with the maximum protrusion being remote from the juxtaposed portions of said parts.

3. A coupling device as defined in claim 1, wherein said spacer means includes radially disposed recesses as mounting means for signal elements.

* * * * *